April 1, 1952 G. J. MULLER 2,591,461
VIBRATION ISOLATOR
Filed Dec. 11, 1945
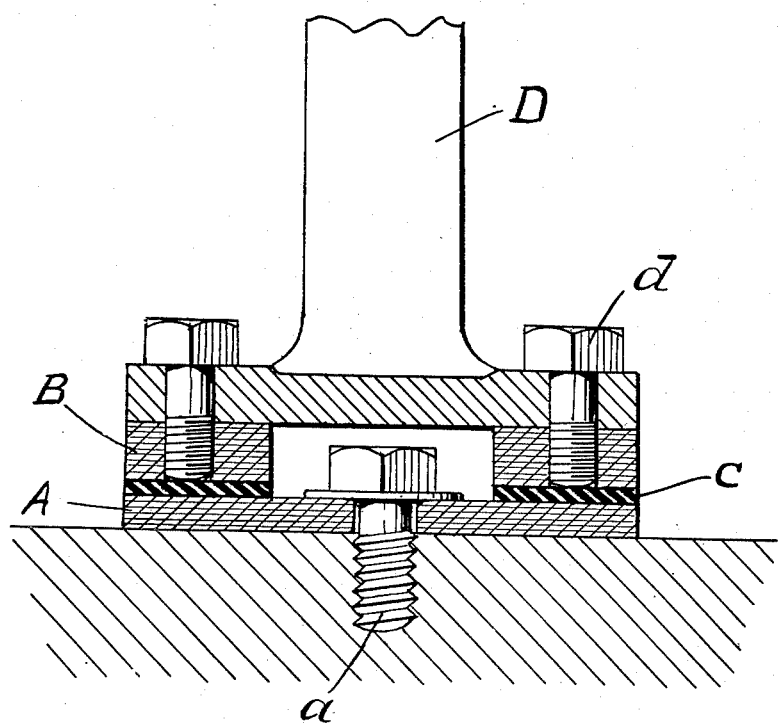
INVENTOR
George J. Muller Patented Apr. 1, 1952

2,591,461

UNITED STATES PATENT OFFICE 2,591,461

VIBRATION ISOLATOR

George J. Muller, Philadelphia, Pa., assignor, by mesne assignments, to Taylor Fibre Co., Norristown, Pa., a corporation of Delaware Application December 11, 1945, Serial No. 634,162

2 Claims. (Cl. 248—22)

This invention relates to an improvement in vibration isolators or absorbers and particularly for isolating the vibration of machines to the floor to which they are secured.

One of the objects of my invention is the provision of means for absorbing the vibrations set up in mill buildings, transmitted thereto through the floors by machines mounted on the floors, and particularly textile mills in which an enormous vibration is set up by the beating of loom lays as well as the throw of the shuttles by the picker sticks and the stopping of the shuttles by the picker sticks, as well as the vibration and noise set up by twisting machines and other machines in yarn handling rooms.

Another object of my invention is the provision of means for securing machines to the floor of a mill or shop whereby the vibrations caused by the machines are not transmitted to the floor through the securing bolts.

Another object of my invention is the provision of an isolator in which the machine is connected to one member of the isolator having damping or vibration absorbing qualities while the isolator is connected to the floor by another member having damping or vibration absorbing qualities with an interposed vibration insulating member between the two damping members.

Having thus set forth in a general way the objects of my invention, I will proceed for illustrative purposes to a detailed description of the preferred embodiment thereof with reference to the accompanying drawing showing a section through one form of an isolator secured to a floor, and to which the foot of a machine has been secured.

The isolator comprises a base member A, which is secured to the floor 10 or the machine supporting portion of the building by a bolt or lag screw 12, a machine supporting member B and an interposed vibration insulator C for preventing the transmission of vibrations from either member A or B to the other through the insulator C.

The members A or B may be formed of cut blanks of fibrous material, such as paper or fabric impregnated with formaldehyde resin or other thermosetting resin molded to form, or may be cut from slabs of formed fibrous material and resin as above described. These members may also be made from material such as the well-known vulcanized fibre, but I preferably form them from fabric impregnated with formaldehyde resin, which I may hereinafter term as phenol fibre.

The member C is preferably formed of rubber, although other resilient material may be used.

Preferably the contour or cross section of the upper portion of the isolators correspond to the contour of the foot or portion of the machine to be supported thereby, and in the drawing, I have illustrated one foot of a machine designated by the reference character D which is secured to the member B of the insulator by means of machine bolts $d$, the member B being bored and threaded for the reception of the bolts, and is also provided with a through opening or openings for a lag screw $a$, or other means for securing the member A to the supporting surface.

In the form shown, the lag screw extends through the center of the member A, but the member A may be extended beyond the member C for the reception of the securing screws or bolts.

The members A, B and C are first formed and then secured to each other by means of an adhesive, such as hot set phenol formaldehyde adhesive, modified polyvinyl acetate adhesive, modified furfural resin adhesive, or any other adhesive having the required qualities for bonding the members to each other.

The advantages of my invention result from the provision of a vibration isolator for supporting and securing machines to the floor or machine supporting portion of a building whereby the vibrations caused by the operations of a machine are isolated from its support, as well as insulating vibrations to the machine caused by the operation of other machines or other causes.

What I desire to secure by Letters Patent is:

1. A vibration isolator pad for securing a machine to a floor, to prevent the transmission of vibrations to the floor from the machine or the transmission of vibrations from the floor to the machine, comprising upper and lower members formed of hardened resin impregnated fibrous material and an interposed resilient vibration insulator formed of elastic material cemented directly to said members, means for directly securing the lower member to the floor without affecting the resiliency of the insulator, and means for directly securing the upper member to a machine without affecting the resiliency of the insulator.

2. A composite vibration isolator pad for interposition between a floor and a machine to eliminate transmission of vibrations between the floor and the machine, comprising a base member formed of fabric impregnated with thermosetting resin, a machine supporting member formed of fabric impregnated with thermosetting resin, and an interposed resilient vibration insulating member formed of rubber cemented face to face with both members.

GEORGE J. MULLER.

REFERENCES CITED

The following references are of record in the file of this patent:

UNITED STATES PATENTS

| Number | Name | Date |
| --- | --- | --- |
| 1,089,748 | Clark | Mar. 10, 1914 |
| 1,683,330 | Chilton | Sept. 4, 1928 |
| 1,703,297 | Chase | Feb. 26, 1929 |
| 2,089,383 | Koerner | Aug. 10, 1937 |
| 2,130,497 | Hueglin | Sept. 20, 1938 |

FOREIGN PATENTS

| Number | Country | Date |
| --- | --- | --- |
| 411,343 | Great Britain | June 7, 1934 |